Nov. 6, 1956

E. V. HARDWAY, JR 2,769,929

ELECTROKINETIC TRANSDUCERS

Filed April 15, 1953

INVENTOR
EDWARD V. HARDWAY, Jr.

BY Stone, Boyden & Mack
ATTORNEYS

Nov. 6, 1956

E. V. HARDWAY, JR 2,769,929

ELECTROKINETIC TRANSDUCERS

Filed April 15, 1953

INVENTOR

EDWARD V. HARDWAY, Jr.

BY Stone, Boyden & Mack

ATTORNEYS

Nov. 6, 1956     E. V. HARDWAY, JR     2,769,929
ELECTROKINETIC TRANSDUCERS
Filed April 15, 1953                     3 Sheets-Sheet 3

INVENTOR
EDWARD V. HARDWAY, Jr.
BY  Stone, Boyden & Mack
ATTORNEYS

United States Patent Office 2,769,929
Patented Nov. 6, 1956

2,769,929
ELECTROKINETIC TRANSDUCERS

Edward V. Hardway, Jr., Richmond, Va., assignor, by mesne assignments, to Consolidated Electrodynamics Corporation, Pasadena, Calif.

Application April 15, 1953, Serial No. 348,975

4 Claims. (Cl. 310—2)

This invention relates to transducing devices and particularly to electrokinetic transducing devices responsive to vibratory displacements.

Piezoelectric devices are often used to measure displacements at high frequencies, but because of the high circuit resistance required, it becomes increasingly difficult to make accurate measurements of displacements with such devices at frequencies less than 100 cycles per second. The present invention provides means for converting into electrical energy transient or periodic displacements over a wide range of frequencies, and down to particularly low frequencies, with sensitivity comparable to that attainable with conventional transducers such as piezoelectric devices, but with substantially lower noise levels. The invention has particular application to vibration measuring instruments, heart displacement detectors and recorders, shaft eccentricity measuring devices, phonograph pickups, and like displacement responsive transducing devices, and makes possible the construction of such devices which respond accurately to both extremely small and relatively large displacements.

My invention involves porous plug type electrokinetic transducers of the type described in detail in my copending application, Serial Number 258,493, filed November 27, 1951, and now Patent Number 2,661,430, granted on December 1, 1953. When such a transducer is coupled to a moving body through rigid coupling means, the transducer responds primarily to velocity or acceleration, rather than to physical displacement. If an elastic coupling means is employed, it would appear that the device would be inoperable as a means for accurately responding to displacements, since both the elastic coupling means and the liquid in the electrokinetic assembly must move in response to the displacement, the movement of the liquid tending to make the response of the transducer inaccurate. I have discovered, however, that by construction of such a device in the manner hereinafter described, this effect of the liquid movement can be made negligible, so that the output voltage of the transducer is related accurately to the physical displacement of the elastic coupling means.

In general, my invention is based upon the discovery that a porous plug electrokinetic transducer will respond accurately to displacement if the transducer is coupled to the source of displacements through resilient means having a stiffness coefficient which is small as compared to the resistance of the porous plug to passage of the electrokinetic liquid, so that the displacement being measured or detected results in a relatively large deflection of the resilient coupling means and the movement of the electrokinetic liquid is negligible as compared to such deflection.

In order that the invention may be understood in detail, reference is had to the accompanying drawing which forms a part of this specification and wherein.

Figure 1:
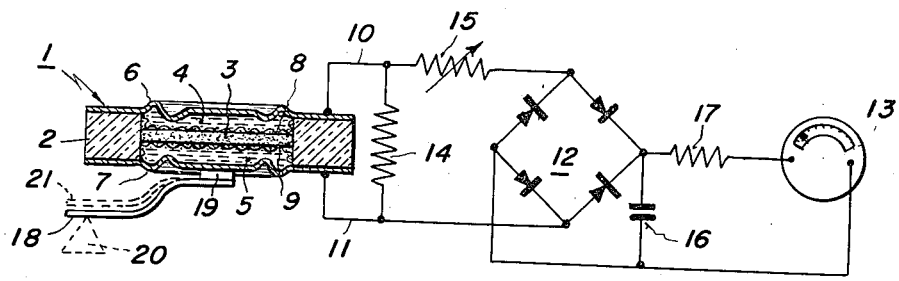
Fig. 1 is a schematic diagram illustrating one form of displacement measuring device constructed in accordance with the invention.

The basic combination involved in my invention is shown schematically in Fig. 1, and includes an electrokinetic cell comprising an enclosure or ring 2 of electrical insulating material such as dense porcelain, a porous ceramic or like insulating plug 3 disposed within the ring 2 and dividing the interior thereof into two chambers 4 and 5, and flexible metal diaphragms 6 and 7 disposed across the faces of the ring to seal the chambers 4 and 5, respectively. The chambers 4 and 5 are filled with a suitable electrokinetic liquid, such as acetonitrile. Electrodes 8 and 9, preferably of wire mesh or the like, are disposed against the faces of the plug 3, and extend into electrical contact with the diaphragms 6 and 7, respectively.

The diaphragms, and hence the electrodes, are respectively connected by input leads 10 and 11 to the input terminals of a bridge-connected germanium crystal rectifier 12, the output of the rectifier being connected to a microammeter or other suitable electroresponsive indicating or recording device 13. A thermally responsive resistor 14 may be connected across the cell 1 to provide temperature compensation, and a variable resistance 15 may be connected in series with the cell to provide for sensitivity adjustment. To provide for steady readings, condenser 16 and resistance 17 are connected in the meter circuit, as shown.

As described in the aforementioned application, Serial Number 258,493, application of pressure to one of the diaphragms 6, 7 will cause a small quantity of the electrokinetic liquid to be forced through the pores of the insulating plug 3, with the result that a potential difference is developed across the plug proportional to such pressure. The potential difference appears between the electrodes 8 and 9, so that current will flow via the rectifier circuit to the meter 13. Release of such pressure allows the opposing diaphragm to restore the cell to its normal condition by forcing the displaced liquid back through the plug, thus causing an equal potential difference in the opposite sense to appear across the electrodes. The device is thus self-generating, responding to fluctuating pressures but being unaffected by steady-state pressures.

In accordance with the present invention, one diaphragm 9 of the electrokinetic cell 1 is coupled to the source of displacements to be measured through a resilient member 18, illustrated as a metallic leaf spring having the configuration of a shallow S. One end of the member 18 may be soldered to a stiff metal block 19 which in turn is soldered to the face of the diaphragm at the center thereof. In use, the transducer is simply held with the free end of the member 18 in contact with the source of vibratory displacements to be measured, such as a part 20 of a machine, displacement of such part causing the member 18 to flex, as indicated at 21.

The resistance $r_v$ of the porous plug of the cell 1 to flow of the electrokinetic liquid may be defined as $$r_v = \frac{nt}{BA}$$

where $n$ is the liquid viscosity in poise, $t$ is the thickness of the plug in centimeters, B is the permeability characteristic, in centimeters squared, unique to the material of the plug, and A is the effective area of the plug in square centimeters.

The stiffness in dynes per centimeter deflection of the elastic member 18 may be taken as $k_s$, and the effective combined stiffness of the diaphragms 8 and 9 in dynes per centimeter deflection of the central portion may be taken as $k_d$. If the member 18 is deflected from its normal rest position by an amount $X_0$, and it is assumed that this results in a displacement of the diaphragm 9 taken as $X_d$, the relative displacement $X_s$ of the member 18 is then $X_0 - X_d$. If the effective area of the diaphragm 9 is $A_d$, the equations for the differential pressure P appearing across the porous plug 3 and giving rise to the streaming potential H can be written as $$PA_d = k_s(X_0 - X_d) - k_d X_d$$

$$P = r_v A_d \frac{dX_d}{dt}$$

Substituting to eliminate all displacements but $X_0$, and substituting the imaginary operator $jw$ for $$\frac{d}{dt}$$

to obtain the frequency relationship, the following is obtained.

$$P = \left[\frac{k_s X_0}{A_d}\right]\left[\frac{1}{1 + \frac{k_s + k_d}{jw r_v A_d^2}}\right]$$

From the above it is evident that the term $$\frac{k_s + k_d}{A_d^2}$$

represents the effective pressure-to-volume stiffness of the spring and diaphragms acting in combination, and that the differential pressure P is proportional to the displacement $X_0$ when the term $$\frac{k_s + k_d}{jw r_v A_d^2}$$

is negligible. When this is true, the voltage output H of the cell 1 will be given by $$H = \frac{Ze}{4\pi nK} P = \left[\frac{Ze}{4\pi nK}\right]\left[\frac{k_s}{A_d}\right] X_0$$

where Z is the zeta potential at the solid-liquid interface, $e$ is the dielectric constant of the electrokinetic liquid, and K is the effective liquid conductivity in the pores of the porous plug 3.

An accepted method for defining acceptable low frequency response is to specify a low-frequency break-point $f_L$ at which the response drops to $$\frac{1}{\sqrt{2}}$$

or 3DB below the mid-band value. Thus, for the instrument of Fig. 1, this point is given by the equation $$f_L = \frac{k_d + k_s}{2\pi r_v A_d^2}$$

$$f_L = \frac{(k_d + k_s)BA}{2\pi A_d^2 nt}$$

For one typical instrument of the type shown in Fig. 1, including acetonitrile as the electrokinetic liquid and using as the plug 3 a porous porcelain disc .75 inch in diameter and .09 inch in thickness, with $B = 5.69 \times 10^{-11} cm.^2$, performance characteristics were as follows:

Sensitivity: 3.25 millivolts/ml displacement
Low frequency (3DB) break point: .0.362 cps.
Cell resistance: approximately 100,000 ohms.
Upper frequency limit: above 100 cps. test range If in a given instrument it is desired to improve the low frequency response, this may be accomplished by sealing the pores of the plug over a portion of its area. In the instrument above referred to, for example, about 3/4 of the disc was masked with wax.

From the foregoing mathematical analysis, it will be understood that the invention involves the combination of an electrokinetic assembly 1 including a porous plug 3 and a flexible diaphragm 9 for forcing an electrokinetic liquid through the plug, with a resilient coupling element or feeler 18, the stiffness coefficients of the diaphragms and spring being negligible as compared to the viscous forces in the plug, that is, the resistance of the plug to passage of the electrokinetic liquid, so that the movement of the electrokinetic liquid through the porous plug will be negligible as compared to the deflection of the spring. Inasmuch as flow resistance and stiffness are different dimensionally, they can most conveniently be quantitatively compared in terms of their ratio which is proportional as previously shown to the low frequency break point $f_L$ which has the dimensions of reciprocal time. The inherent advantages of the apparatus shown herein over other existing types of transducers are most evident at lower frequencies where $f_L$ is less than 100 cycles per second. It has, however, been illustrated that $f_L$ may be made only a small fraction of a cycle per second, the devices then being accurately responsive to displacements at frequencies above $f_L$.

Figures 2, 3:
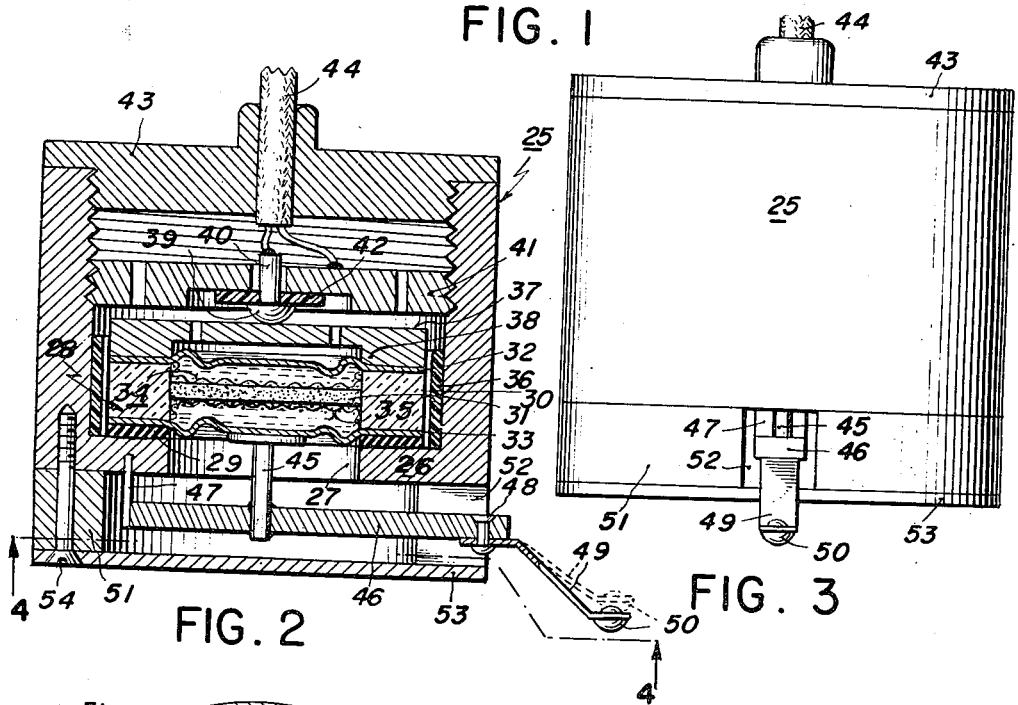
Fig. 2 is a vertical sectional view, with some parts shown in elevation, of a particular embodiment of the invention useful as a vibration measuring device.
Fig. 3 is a vertical elevational view of the device of Fig. 2.
Figure 4:
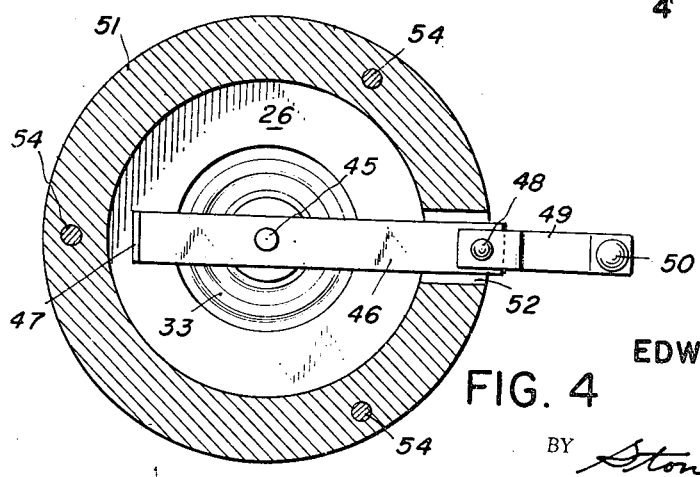
Fig. 4 is a transverse sectional view of the same taken on the line 4—4, Fig. 3.

One particular embodiment of an instrument constructed in accordance with the invention, for measuring vibration, shaft eccentricity, and the like, is illustrated in detail in Figs. 2–4. The instrument comprises a tubular metal housing 25 having an inturned annular shoulder 26 and an axial opening 27. An electrokinetic cell 28, similar to the cell 1, Fig. 1, is positioned against the elastic gasket 29 located by the shoulder 26. The cell 28 includes a dense porcelain insulating ring 30, with a porous porcelain plug 31 sealed at its periphery thereto as shown to divide the bore of the ring into two chambers. The chambers are filled with an electrokinetic liquid, such as acetonitrile, and closed by flexible metal diaphragms 32 and 33. Wire mesh or like electrodes 34 and 35 are provided in the two chambers and are disposed in electrical contact with the diaphragms 32 and 33, respectively. An electrical insulating tube 36 is provided, surrounding the entire cell 28.

At its end opposite the shoulder 26, the housing is provided with interior threads. A metal pressure plate 37, provided with an annular clamping portion 38, is positioned with its clamping portion in engagement with the marginal portion of the diaphragm 32, and aligned with the ring 30. A metal clamping stud is disposed with its spherical head 39 engaging the pressure plate 37 at the center thereof and with its shank 40 extending through the central opening of a clamping disc 41 threaded to the housing 25, the stud being insulated from the clamping disc by an insulating washer 42. An end plate 43 is threaded into the open end of housing 25 to close the same, and includes a central opening through which passes a two-conductor insulated cable 44. One conductor of the cable is soldered to the shank 40 of the clamping stud and is thus electrically connected to electrode 34 through conductive members 39, 37 and 32. The other conductor is soldered to the clamping disc 41 and is connected to the other electrode 35 through the conductive housing 25 and means hereinafter described.

Soldered to the working face of diaphragm 33 is a metal coupling stud having a shank 45 extending through an opening in and soldered to a metal operating arm 46 in the nature of a lever. One end of the arm 46 is rigidly connected to a leaf spring 47 fixed in the housing 25. At its other end the arm 46 is connected, as by rivet 48, to a spring feeler 49. The spring 49 may be offset from the arm 46 and provided at its tip with a button 50 to contact a machine part (not shown) or other source of vibratory displacements. An annular shroud 51, having a lateral opening 52 accommodating the arm 46 and spring 49, and a closure 53 complete the structure, the shroud 51 and plate 53 being secured in place by suitable means such as machine screws 54. It will be noted that the diaphragm 33 is electrically connected to the casing 25 through the shank 45, arm 46, and metal spring 47, thus completing the electrical connection of the cell 28 to the conductors of cable 44. The cable 44 may be connected to a suitable electrical responsive indicator or recorder in the manner previously described with reference to Fig. 1.

As has been described, the instrument is so constructed that the effective stiffness characteristic of the springs 47 and 49 and the diaphragms 32 and 33 are negligible as compared with the resistance of the plug 31 to flow of the electrokinetic liquid therethrough, the transducer having a low frequency break-point of less than 100 cycles per second.

In operation, the instrument is simply held manually so that the contact button 50 of spring 49 is in contact with the machine part or other element subject to the vibratory displacements to be detected. If desired, the device may be provided with suitable feet to steady the instrument relative to the work, as will be described in detail in connection with another embodiment of the invention.

Figure 5:
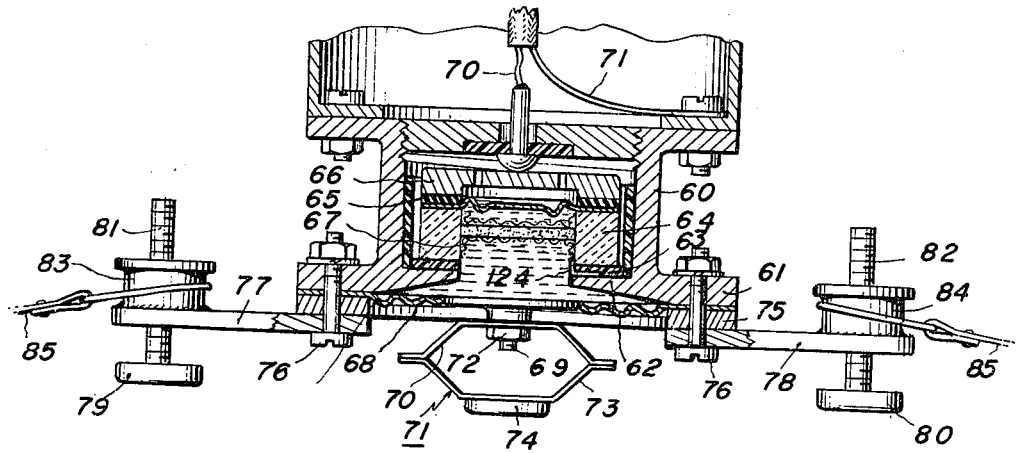
Fig. 5 is a vertical sectional view, with some parts shown in elevation, of another embodiment of the invention useful as a heart displacement instrument.
Figure 6:
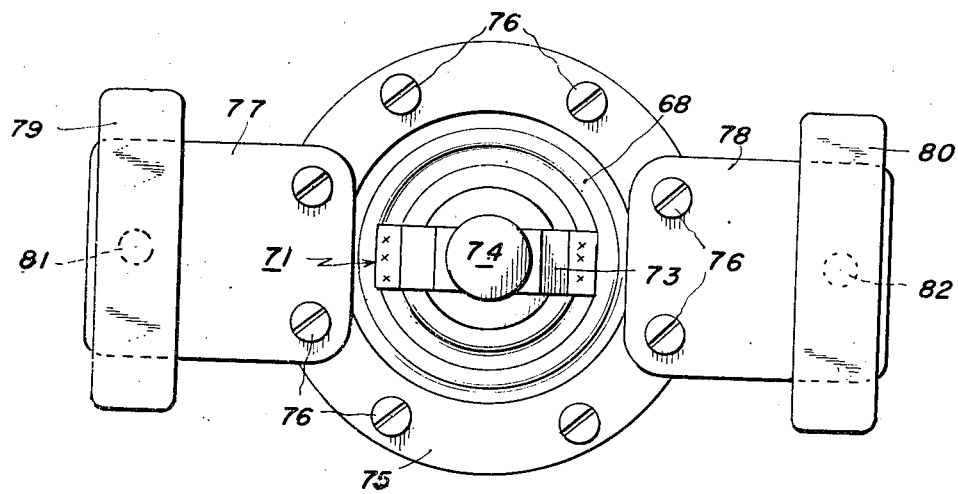
Fig. 6 is a bottom plan view of the device of Fig. 5.
Figure 7:
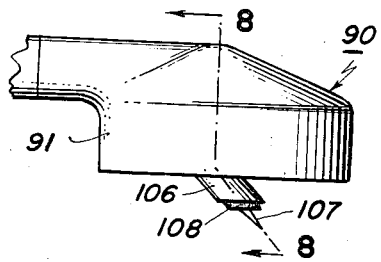
Fig. 7 is a side elevational view of a phonograph pickup constructed in accordance with the invention.
Figure 8:
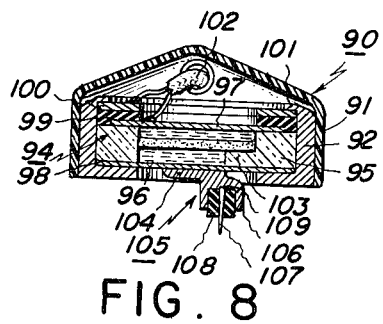
Fig. 8 is a vertical sectional view taken on the line 8—8, Fig. 7.
Figure 9:
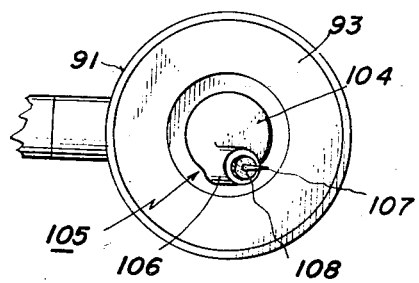
Fig. 9 is a bottom plan view of the device of Fig. 7.

Turning now to the next embodiment of the invention, Figs. 5 and 6 illustrate a device particularly adapted for measuring displacements over the precordium due to the beating of the heart in human patients. This device comprises an annular housing 60, terminating at one end in an exterior flange 61 and an interior shoulder 62. Positioned by the shoulder 62, but spaced therefrom by a noncompliant gasket 63 is an electrokinetic cell 64. The cell 64 is generally similar to the cell 28, Fig. 2, and comprises an insulating ring divided into two internal chambers by a porous plug, each chamber being filled with a suitable electrokinetic liquid and including wire mesh or similar electrodes. The upper chamber, as seen in Fig. 5, is closed directly by a flexible metal diaphragm and clamping pressure for the cell is applied to the diaphragm through an annular, compliant gasket 65 and a pressure plate 66, clamping pressure being applied to the pressure plate 66 in the same general manner described with reference to Fig. 2. The other chamber of the cell 64, containing electrode 67, extends beyond the ring of the cell, there to be defined by the surfaces of the flange 62, and is closed by a flexible diaphragm 68. A metal foil conductor 124 extends around the gasket 63 to electrically connect the electrode 67 to the housing 60. It will thus be understood that the two electrodes of the cell are connected respectively to conductors 70 and 71 of a suitable electrical cable, so that the cell may be connected to electro-responsive means such as a recording oscillograp (not shown).

Soldered to the central portion of the diaphragm 68 is a threaded stud 69 extending through one leaf 70 of a double leaf spring 71, the spring 71 being retained in place by a nut 72. The other leaf 73 of the spring carries a rigid contact button 74.

The diaphragm 68 is secured in place, sealing its chamber of the cell by means of a metal ring 75 and bolts 76. A film of microcrystalline wax may be provided between flange 61 and diaphragm 68 to effect a liquid seal. Secured in place by bolts 76 are two diametrically extending brackets 77 and 78, these brackets adjustably carrying suitable spacing feet 79 and 80. Thus, the feet 79 and 80 may be secured to threading shanks 81 and 82, respectively, which extend through interiorly threaded posts 83 and 84, respectively.

In using the device to measure heart displacements of a patient, the spacing feet 79 and 80 are adjusted so that the contact button 74 is maintained lightly against the chest of the patient when the spacing feet also contact the chest. The entire instrument may be held in this position by a suitable strap 85 encircling the patient's body and having wire and loops connected to the posts 83 and 84. The beating of the patient's heart will then cause periodic displacements of the precordium between the feet 79 and 80, which displacements are imparted to the contact button 74 and thus to the spring 71. Again, the flow resistance of the porous plug of the cell 64 is made so large that the deflection of the cell diaphragms is negligible as compared to the flexure of the spring 71. Hence the output voltage of the cell is proportional to the deflection of the contact button 74 and thus to the heart displacements of the patient.

Figs. 7–10 illustrate the invention as applied to a phonograph pickup. The device includes a housing 90 for attachment to the tone arm and having a dependent skirt 91. Secured within the skirt 91 in any suitable manner is a cylindrical casing 92 of aluminum alloy or the like, the casing having an inturned lower flange 93. An electrokinetic cell 94 comprising a dense porcelain ring 95, a porous plug 96, and diaphragms 97 and 98, is positioned within the casing 92 with the marginal portion of diaphragm 98 directly contacting the flange 93. Overlying the diaphragm 97 there is provided an annular elastic gasket 99 and a metal washer 100. The upper end of the casing 92 is crimped over, as shown at 101, to clamp the entire cell assembly securely in place. The interior chambers of the cell are filled with a suitable electrokinetic liquid. In this embodiment the diaphragms 97 and 98 constitute the electrodes of the cell and are connected respectively to the two conductors of a suitable cable 102. Such connection is made by soldering one of the conductors directly to the diaphragm 97 and the other conductor to the metal ring 100, this other conductor thus being electrically connected to the diaphragm 98 via the conductive casing 92.

Figure 10:
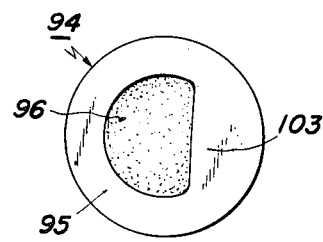
Fig. 10 is a bottom plan view of the electrokinetic cell employed in the device of Fig. 7.

As best seen in Fig. 10, the porcelain insulating ring 95 is provided with an extension 103 overlying a portion of the lower face of the porous plug 96. This extension is of such thickness that it completely fills the space between that face of the plug 96 and the adjacent diaphragm 98.

Rigidly connected to the working face of the diaphragm 98 is the base 104 of a rigid metal coupling member 105. It will be noted that the base 104 of the coupling member covers the central area of the diaphragm 98 and overlaps the extension 103. The coupling member 105 also includes a socket portion 106 in which is centrally aligned the phonograph needle 107, the space between the needle and the socket portion being completely filled with a suitable elastomer, as indicated at 108. The head of the needle may be positioned at 109 in an indentation in the member 105 so that the needle is free to pivot about its head. It will be noted from Fig. 8 that the needle is substantially aligned with the end of the extension 103. Thus the needle may not reciprocate axially to displace the diaphragm 98 because the diaphragm is backed up by the extension 103. When the needle 107 is subjected to a lateral deflection, a restoring force in opposition to such deflection is supplied by the elastic means 108. This results in a torque being produced on coupling member 105 which is opposed by the resilient diaphragm 98 acting upon the base 104. A pressure is thus produced in cell 94 proportional to the deflection of needle 107.

The elastic body 108, which may be of rubber, synthetic rubber, or any other similar material, serves the same purpose as the spring 71, Fig. 5, or the spring 49, Fig. 2. That is, use of the elastic means 108 makes it possible to convert deflections of the needle into pressure variations in the electrokinetic cell, which pressure variations are proportional to said deflections over a wide range of frequencies.

Figure 11:
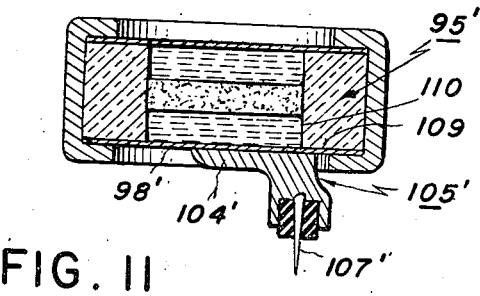
Fig. 11 is a sectional view similar to Fig. 8 of a modified embodiment of the invention.

A modified form of the embodiment of Figs. 7–10 is illustrated in Fig. 11. Here, the base 104' of the rigid coupling member 105' overlaps at 109 the inner edge 110 of the insulating ring 95' of the cell. Thus, the ring of the cell is not provided with an extension and the diaphragm 98' is caused to flex about the point 109. It will be understood that this embodiment of the invention is not limited to use as a phonograph pickup but may be employed generally for measuring vibratory displacements. Thus, the phonograph needle may be replaced by a simple rigid feeler 107', Fig. 11.

Figure 12:
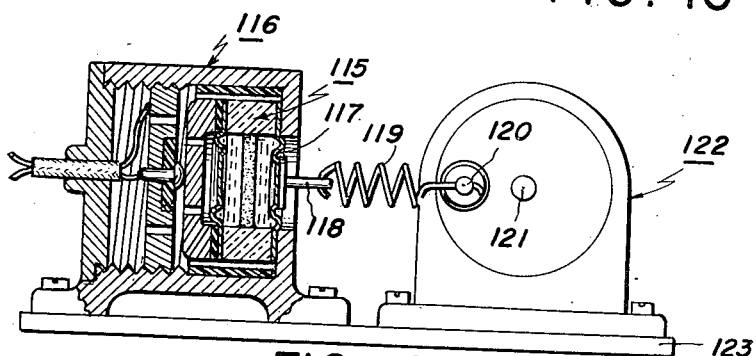
Fig. 12 is an elevational view, partly in vertical section, of an embodiment of the invention adapted to convert a cyclic displacement of predetermined frequency into a sinusoidal alternating voltage.

Fig. 12 illustrates the invention as applied to a device for producing a sinusoidal alternating voltage of a predetermined frequency. Here, an electrokinetic cell 115 is rigidly mounted within a housing 116 in the same general manner as was described with reference to Fig. 2. The exposed diaphragm 117 of the cell is rigidly connected to an operating stud 118, which, in turn, is connected to one end of an elastic member 119, such as a simple helical spring. The other end of the elastic member 119 is connected to any suitable eccentric means 120 carried by the shaft 121 of a synchronous electric motor 122. The housing 116 and the motor 122 are so spaced, as by being mounted on the base 123, that the elastic member 119 will be maintained under tension throughout the entire operating cycle of the eccentric driven by the motor.

The combination is again so constructed that the stiffness characteristics of the cell diaphragms and the elastic member 119 are small or negligible as compared to the resistance of the porous plug of the cell to passage of the electrokinetic liquid, when the frequency of operation is above the low frequency break-point $f_L$. This being so, during operation of the device, the cell 115 will have an alternating output voltage varying sinusoidally at the frequency established by the rotating eccentric. Such a device may be used, for example, as a source of voltage for a very low frequency oscillator. It will be understood that any suitable means other than the synchronous motor and eccentric may be employed to apply controlled displacements to the elastic member 119.

Referring again to the embodiments of Figs. 2 through 11, particular attention is called to the fact that the combinations there shown make possible the construction of an instrument for measuring cyclic or transient vibratory displacements which is self-generating and therefore requires no calibrated exterior source of current.

I claim:

1. In an electrokinetic transducer having an enclosure, a porous plug located in the enclosure and dividing it into two chambers, an electrokinetic liquid located in the two chambers, and movable means for changing the pressure relationship of the liquid in the chambers to cause the liquid to pass through the porous plug, the improvement which comprises displaceable means adapted to move in response to phenomenon to be measured, and compliant means coupled between the displaceable means and the movable means for applying force to the movable means which is proportional to the physical displacement of the displaceable means so that the pressure relationship of the liquid in the two chambers is proportional to the physical displacement of the displaceable means, with the combined stiffness of the movable means and of the compliant means being less than the resistance of the porous plug to the passage of the electrokinetic liquid to cause movement of the liquid through the porous plug to be small with respect to the movement of the displaceable means, so that the potential which is caused by movement of the liquid through the porous plug is proportional to the physical displacement of said displaceable means.

2. In an electrokinetic transducer having an enclosure, a porous plug located in the enclosure and dividing it into two chambers, an electrokinetic liquid located in the two chambers, and movable means for changing the pressure relationship of the liquid in the chambers to cause the liquid to pass through the porous plug, the improvement which comprises displaceable means adapted to move in response to phenomenon to be measured, and a resilient member coupled between the displaceable means and the movable means for converting displacement of the displaceable means to changes in the pressure relationship of the liquid in the chambers, with the combined stiffness of the movable means and of the resilient member being less than the resistance of the porous plug to the passage of the electrokinetic liquid to cause movement of the liquid through the porous plug to be small with respect to the movement of the displaceable means, so that the potential which is caused by movement of the liquid through the porous plug is proportional to the physical displacement of said displaceable means.

3. In an electrokinetic transducer having an enclosure, a porous plug located in the enclosure and dividing it into two chambers, an electrokinetic liquid located in the two chambers, and movable diaphragm means for changing the pressure relationship of the liquid in the two chambers to cause the liquid to pass through the porous plug, the improvement which comprises a feeler element adapted to be displaced in accordance with phenomena to be sensed, and a resilient member coupled between the feeler element and the diaphragm means for applying a force to the diaphragm means which is proportional to the physical displacement of the feeler element to cause the pressure relationship of the liquid in the two chambers to change in accordance with the physical displacement of the feeler element, the low frequency break point of the transducer being less than 100 cycles per second and the stiffness characteristics of the resilient member and the diaphragm means being small compared to the flow resistance of the porous plug to passage of the electrokinetic liquid at frequencies above said break point.

4. In an electrokinetic transducer having an enclosure, a porous plug located in the enclosure and dividing it into two chambers, an electrokinetic liquid located in the two chambers, and movable diaphragm means for changing the pressure relationship of the liquid in the two chambers to cause the liquid to pass through the porous plug, the improvement which comprises a feeler element which may be displaced in accordance with phenomena to be sensed, spring means coupled between the feeler element and said diaphragm means for converting displacements of the feeler element to changes in the pressure relationship of the liquid in the two chambers, with the stiffness of said diaphragm means and of the spring means being small compared to the resistance of the porous plug to the passage of electrokinetic liquid through it to cause the movement of the liquid through the porous plug to be small with respect to movement of the feeler element, so that the potential which is caused by the passage of the electrokinetic liquid through the porous plug varies in accordance with the physical displacement of the feeler element.

References Cited in the file of this patent

UNITED STATES PATENTS

| 1,669,170 | Nicolson | May 8, 1928 |
| 1,977,433 | Dunning | Oct. 16, 1934 |
| 2,074,417 | Olsen | Mar. 23, 1937 |
| 2,355,194 | Wiggins | Aug. 8, 1944 |
| 2,535,479 | Aust | Dec. 26, 1950 |

(Other references on following page)

UNITED STATES PATENTS

| | | |
|---|---|---|
| 2,550,005 | Doll | Apr. 24, 1951 |
| 2,571,124 | Farrand | Oct. 16, 1951 |
| 2,596,048 | Severs | May 6, 1952 |
| 2,615,940 | Williams | Oct. 28, 1952 |

FOREIGN PATENTS

| | | |
|---|---|---|
| 549,991 | Germany | May 7, 1932 |

OTHER REFERENCES

"An Electrokinetic Transducer," by Williams, in Review of Scientific Instruments, vol. 19, No. 10, October 1948, pp. 640–646.